United States Patent
Fong et al.

(10) Patent No.: US 9,473,275 B2
(45) Date of Patent: Oct. 18, 2016

(54) GAIN ASYMMETRY CHARACTERIZING CIRCUIT AND METHOD FOR DETERMINING CHARACTERISTICS OF GAIN ASYMMETRY POSSESSED BY TRANSMITTER

(71) Applicant: MediaTek Singapore Pte. Ltd., Singapore (SG)

(72) Inventors: Neric Fong, Santa Clara, CA (US); Bing Xu, Gilbert, AZ (US); Wei-Cheng Liu, Taoyuan County (TW); Terry W Chen, Saratoga, CA (US)

(73) Assignee: MediaTek Singapore Pte. Ltd., Singapore (SG)

( * ) Notice: Subject to any disclaimer, the term of this patent is extended or adjusted under 35 U.S.C. 154(b) by 77 days.

(21) Appl. No.: 14/532,013

(22) Filed: Nov. 4, 2014

(65) Prior Publication Data

US 2015/0131457 A1    May 14, 2015

Related U.S. Application Data

(60) Provisional application No. 61/903,393, filed on Nov. 13, 2013.

(51) Int. Cl.
  *H04L 1/24* (2006.01)
  *H04L 25/49* (2006.01)
  *H04B 3/46* (2015.01)

(52) U.S. Cl.
  CPC ............ *H04L 1/243* (2013.01); *H04L 1/248* (2013.01); *H04L 25/49* (2013.01); *H04B 3/46* (2013.01)

(58) Field of Classification Search
  CPC ......... H04B 3/46; H04L 1/243; H04L 1/248; H04L 25/49
  See application file for complete search history.

(56) References Cited

U.S. PATENT DOCUMENTS

| 6,392,480 B1 | 5/2002 | Ghanadan |
| 7,362,170 B2 | 4/2008 | Louis |

(Continued)

FOREIGN PATENT DOCUMENTS

| CN | 1289177 A | 3/2001 |
| CN | 1976217 B | 3/2012 |
| CN | 102946615 A | 2/2013 |
| WO | 2009023825 A3 | 2/2009 |

OTHER PUBLICATIONS

Mirzaei, "Analysis of Direct-Conversion IQ Transmitters With 25% Duty-Cycle Passive Mixers," IEEE Trans. on Circuits and Systems, Oct. 2011.

*Primary Examiner* — Jean B Corrielus
(74) *Attorney, Agent, or Firm* — Winston Hsu; Scott Margo (57) ABSTRACT

A gain asymmetry characterizing circuit for determining characteristics of gain asymmetry possessed by a transmitter includes a baseband loopback path, a test signal generating unit and a gain asymmetry measuring unit. The baseband loopback path is coupled to a baseband node on a first transmission path of the transmitter. The test signal generating unit is arranged to generate a first differential baseband test signal pair to the first transmission path. The first differential baseband test signal pair includes a first baseband signal and a second baseband signal. During a first period, the first baseband signal and the second baseband signal are fed into a positive input node and a negative input node of the first transmission path, respectively. During a second period, the second baseband signal and the first baseband signal are fed into the positive input node and the negative input node of the first transmission path, respectively.

15 Claims, 6 Drawing Sheets

(56) References Cited

U.S. PATENT DOCUMENTS

| | | | | |
|---|---|---|---|---|
| 8,378,731 B1* | 2/2013 | Tang | ................... | H03F 3/45201 327/306 |
| 2010/0302083 A1* | 12/2010 | Helfenstein | ............. | H04L 25/49 341/118 |
| 2013/0121388 A1* | 5/2013 | Tseng | ..................... | H03D 3/009 375/221 |
| 2013/0279630 A1 | 10/2013 | Xu | | |
| 2015/0030103 A1* | 1/2015 | Hormis | ................. | H04L 27/364 375/296 |

* cited by examiner

GAIN ASYMMETRY CHARACTERIZING CIRCUIT AND METHOD FOR DETERMINING CHARACTERISTICS OF GAIN ASYMMETRY POSSESSED BY TRANSMITTER

CROSS REFERENCE TO RELATED APPLICATIONS

This application claims the benefit of U.S. Provisional Application No. 61/903,393, filed on Nov. 13, 2013, the contents of which are incorporated herein by reference.

BACKGROUND

The present invention relates to measuring characteristics of a transmitter, and more particularly, to a gain asymmetry characterizing circuit capable of determining characteristics of gain asymmetry possessed by a transmitter, and a method thereof.

Radio frequency (RF) circuits are commonly applied in transceivers, transmitters and receivers, to provide mixed-signal systems on a chip for wireless applications. When an RF transmitter utilizes a passive mixer without reverse isolation, an asymmetry phenomenon will occur in the RF transmitter.

Figure 1:
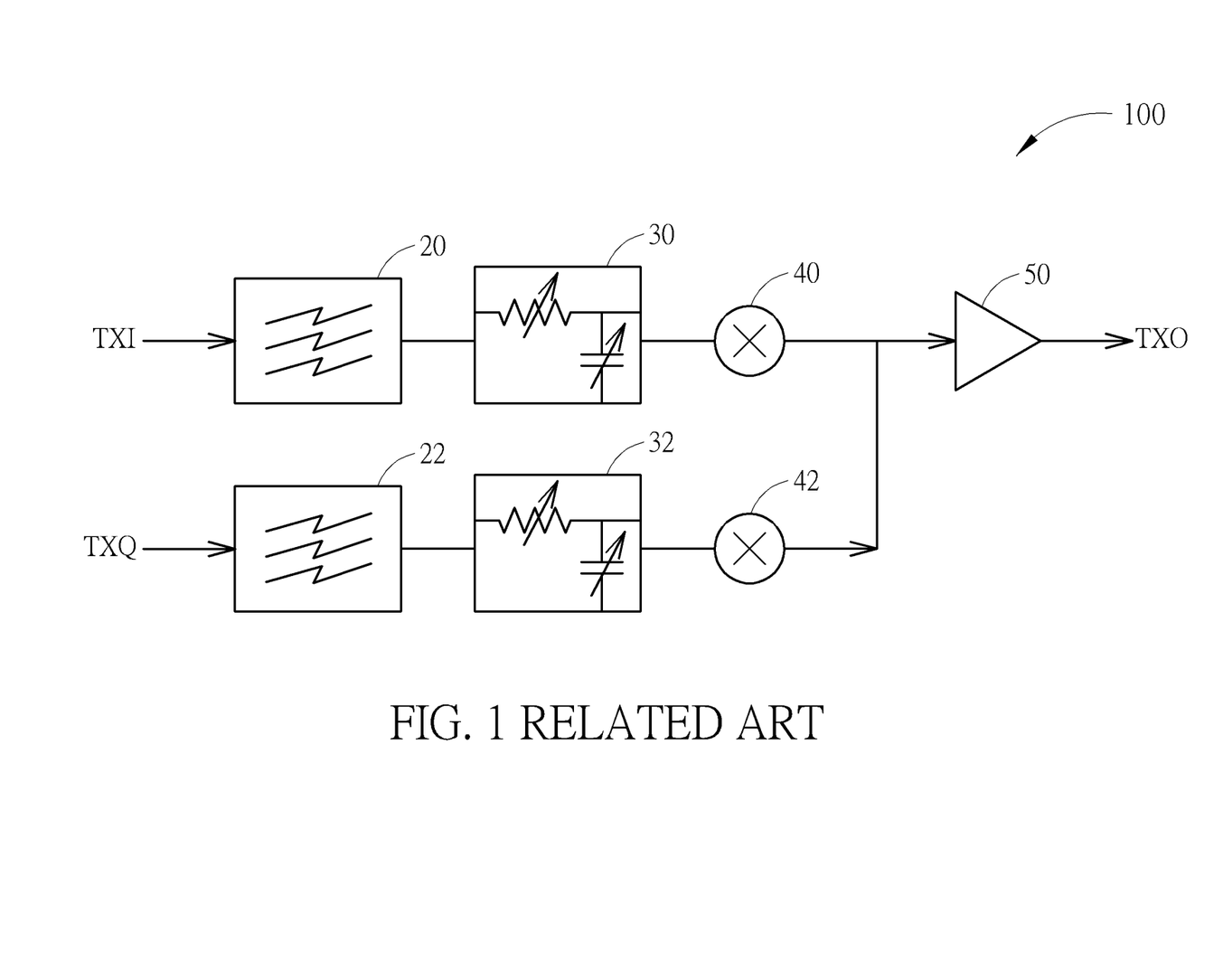
FIG. 1 is a diagram illustrating a traditional RF transmitter.
Figure 5:
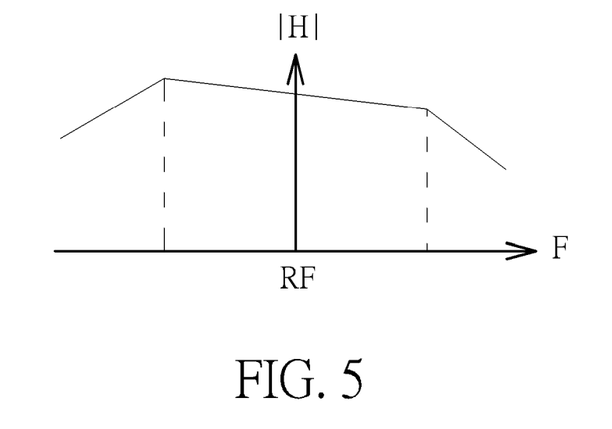
FIG. 5 is a diagram illustrating the overall frequency response of the gain asymmetry of the transmitter generated by combining the frequency response of the positive sideband of the gain asymmetry shown in FIG. 3 and the frequency response of the negative sideband of the gain asymmetry shown in FIG. 4.

Please refer to FIG. 1, which is a diagram illustrating a traditional radio-frequency (RF) transmitter. As shown in FIG. 1, the RF transmitter 100 includes an in-phase input end TXI and a quadrature input end TXQ. For example, the in-phase input end TXI is used to generate the in-phase component of a sinusoid, and the quadrature phase input end TXQ is used to generate the quadrature phase component of a sinusoid. There is a 90 degree phase difference between the in-phase and quadrature phase components. By adjusting these two components, a goal of adjusting the amplitude, frequency and phase of the sinusoid can be achieved. The in-phase transmission path includes a filter 20, a resistor-capacitor (RC) circuit 30, a passive mixer 40 and an amplifier (e.g. a programmable gain amplifier) 50, wherein the filter 20 includes a transfer function. Similarly, The quadrature phase transmission path includes a filter 22, a RC circuit 32 and a passive mixer 42. These two paths are joint at the output end of the passive mixer 40. The amplifier 50 outputs signals to an output TXO. The signals at the input ends of the passive mixers 40 and 42 will be affected by the signals at the output ends of the passive mixers 40 and 42, respectively, resulting in the asymmetry transfer function in RF. For example, an example of an asymmetry function is shown in FIG. 5. Although the asymmetry can be compensated in the digital domain to achieve spectrum flatness, the transfer function has to be characterized in advance to achieve the desired compensation. Measuring the gain asymmetry for an RF transmitter requires the RF transmitter to have certain characteristics such as good linearity, low noise, good in-phase quadrature (I-Q) matching and a flat frequency response over process, voltage and temperature (PVT) variations. Unfortunately, the RF frequency response can be easily corrupted by external loading from the output TXO. That is, It is difficult to use RF circuits to measure gain asymmetry, because RF circuit frequency response is sensitive to linearity, PVT, external loading and etc.

Therefore, there is a need for a novel mechanism for characterizing the gain asymmetry of an RF transmitter that can achieve spectrum flatness.

SUMMARY

An embodiment of the present invention provides a gain asymmetry characterizing circuit. The gain asymmetry characterizing circuit is utilized for determining characteristics of gain asymmetry possessed by a transmitter, and includes a baseband loopback path, a test signal generating unit and a gain asymmetry measuring unit. The baseband loopback path is coupled to a baseband node on a first transmission path of the transmitter, where the first transmission path is formed between a filter and a mixer. The test signal generating unit is arranged to generate a first differential baseband test signal pair to the first transmission path, where the first differential baseband test signal pair is transmitted from the filter to the test signal generating unit. The first differential baseband test signal pair includes a first baseband signal and a second baseband signal, where the first baseband signal TXQP and the second baseband signal TXQN are transmitted from the filter to the test signal generating unit and are out of phase. During a first period, the first baseband signal and the second baseband signal are fed into a positive input node and a negative input node of the first transmission path, respectively. During a second period, the second baseband signal and the first baseband signal are fed into the positive input node and the negative input node of the first transmission path, respectively. The gain asymmetry measuring unit is arranged to measure a response of a positive sideband of the gain asymmetry according to a first baseband loopback signal received from the baseband loopback path during one of the first period and the second period, and measure a response of a negative sideband of the gain asymmetry according to the first baseband loopback signal received from the baseband loopback path during another of the first period and the second period.

Another embodiment of the present invention provides a gain asymmetry characterizing method. The gain asymmetry characterizing method is utilized for determining characteristics of gain asymmetry possessed by a transmitter, and comprises the steps of: coupling a baseband loopback path to a baseband node on a first transmission path of the transmitter; generating a first differential baseband test signal pair to the first transmission path, wherein the first differential baseband test signal pair includes a first baseband signal and a second baseband signal; during a first period, feeding the first baseband signal and the second baseband signal into a positive input node and a negative input node of the first transmission path, respectively; and during a second period, feeding the second baseband signal and the first baseband signal into the positive input node and the negative input node of the first transmission path, respectively; measuring a response of a positive sideband of the gain asymmetry according to a first baseband loopback signal received from the baseband loopback path during one of the first period and the second period; and measuring a response of a negative sideband of the gain asymmetry according to the first baseband loopback signal received from the baseband loopback path during the other of the first period and the second period.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should not be interpreted as a close-ended term such as "consist of". Also, the term "couple" is intended to mean either an indirect or direct electrical connection. Accordingly, if one device is coupled to another device, that connection may be through a direct electrical connection, or through an indirect electrical connection via other devices and connections.

Figure 2:
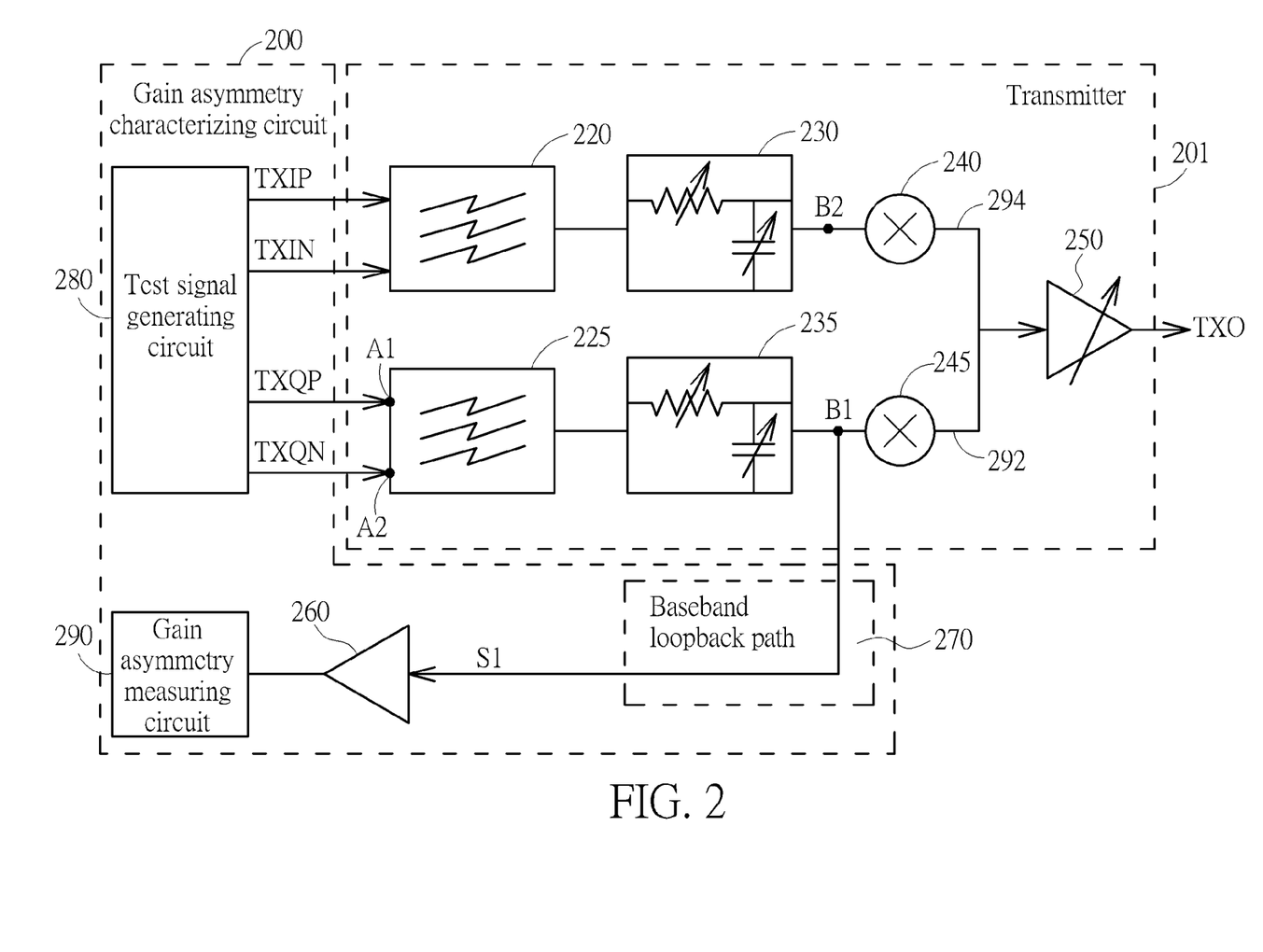
FIG. 2 is a diagram illustrating a gain asymmetry characterizing circuit of an embodiment of the present invention.

Please refer to FIG. 2, which is a diagram illustrating a gain asymmetry characterizing circuit 200 of an embodiment of the present invention. The gain asymmetry characterizing circuit 200 is utilized for determining characteristics of gain asymmetry possessed by a transmitter 201. As shown in FIG. 2, the transmitter 201 includes filters 220, 225, RC circuits 230, 235, mixers 240, 245 and an amplifier (e.g. a programmable gain amplifier 250), where the filter 225, the RC circuit 235 and the mixer 245 are located on a first transmission path 292 of the transmitter 201 (e.g. a quadrature path), and the filter 220, the RC circuit 230 and the mixer 240 are located on a second transmission path 294 of the transmitter 201 (e.g. an in-phase path). The filters 220, 225 may be band-pass filters; however, this is merely an example, and is not meant to be a limitation of the present invention. In another example, the filters 220, 225 may be low-pass filters or high-pass filters. In addition, the mixers 240, 245 may be passive mixers. It should be noted that only the elements pertinent to the present invention are illustrated in FIG. 2 for clarity and simplicity, and the transmitter 201 may include additional elements.

The gain asymmetry characterizing circuit 200 includes a baseband buffer 260, a baseband loopback path 270, a test signal generating unit 280 and a gain asymmetry measuring unit 290. The baseband loopback path 270 is coupled to a baseband node on one of the transmission paths of the transmitter 201. In this embodiment, the baseband loopback path 270 is coupled to a baseband node B1 on the first transmission path 292 (the quadrature path). The baseband node B1 where the loopback signal is extracted is located between the RC circuit 235 and the mixer 245.

In this embodiment, the test signal generating unit 280 is arranged to generate a first differential baseband test signal pair to the first transmission path 292. Specifically, the test signal generating unit 280 transmits the first differential baseband test signal pair to the filter 225. The first differential baseband test signal pair includes a first baseband signal TXQP and a second baseband signal TXQN, where the first baseband signal TXQP and the second baseband signal TXQN are out of phase, the first baseband signal TXQP is a positive quadrature signal, and the second baseband signal TXQN is a negative quadrature signal. Please note that the test signal generating unit 280 may simultaneously transmit another differential baseband test signal pair to the filter 220. For example, the test signal generating unit 280 may transmit a third baseband signal TXIP and a fourth baseband signal TXIN to the filter 220, wherein the third baseband signal TXIP and the fourth baseband signal TXIN are out of phase, the third baseband signal TXIP is a positive in-phase signal, and the fourth baseband signal TXIN is a negative in-phase signal.

In this embodiment, the test signals (i.e. baseband signals TXIP, TXIQ, TXQP, TXQN) are properly configured during the gain asymmetry characterization procedure. For example, during the first period of the gain asymmetry characterization procedure, the third baseband signal TXIP, the fourth baseband signal TXIN, the first baseband signal TXQP and the second baseband signals TXQN outputted from the test signal generating unit 280 may be $A\sin\Phi$, $-A\sin\Phi$, $-A\cos\Phi$ and $A\cos\Phi$, respectively, thus allowing the gain asymmetry measuring unit 290 to obtain the response of the positive sideband of the gain asymmetry; during the second period of the gain asymmetry characterization procedure, the third baseband signal TXIP, the fourth baseband signal TXIN, the first baseband signal TXQP and the second baseband signals TXQN outputted from the test signal generating unit 280 may be $A\sin\Phi$, $-A\sin\Phi$, $A\cos\Phi$ and $-A\cos\Phi$, respectively, thus allowing the gain asymmetry measuring unit 290 to obtain the response of the negative sideband of the gain asymmetry. Each of the test signals (i.e. baseband signals TXIP, TXIQ, TXQP, TXQN) is a single-tone sinusoidal signal, where A denotes the amplitude and $\Phi$ denotes the phase. The aforementioned baseband signals of the first and second periods of the gain asymmetry characterization procedure are merely for illustrative purposes, and not meant to be limitations of the present. Moreover, please note that the calibration signals (e.g., the sinusoidal signal) do not have to be single-tone. It can be any reference signals; for example, multi-tone, a symbol etc.

The baseband buffer 260 is coupled between the baseband loopback path 270 and the gain asymmetry measuring unit 290. Preferably, the input impedance of the baseband buffer 260 is required to be higher than an input impedance of the mixer 245 and an output impedance of the filter 225, and the baseband buffer 260 is required to have a flat frequency response across the gain asymmetry bandwidth. The high input impedance of the baseband buffer 260 can minimize loading at the RC circuit/mixer interface, and the flat frequency response does not affect the following gain asymmetry measurement. The baseband buffer 260 may be optional, depending upon actual design considerations.

Figure 3:
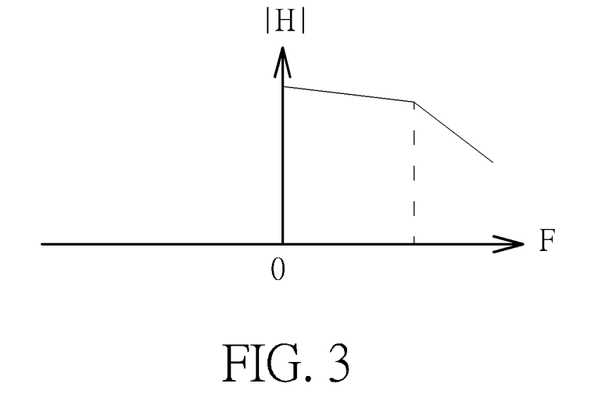
FIG. 3 is a diagram illustrating the frequency response of the positive sideband of the gain asymmetry measured by the gain asymmetry measuring unit shown in FIG. 2.

As can be seen from FIG. 2, the gain asymmetry characterization is based on the baseband loopback signal (obtained before up-conversion) rather than the RF loopback signal (obtained after up-conversion). The gain asymmetry is an I-Q coupling phenomena in RF. Hence, to obtain a complete response of the gain asymmetry in the baseband domain, the proposed gain asymmetry characterization flips (i.e. swaps) test signals for one transmission path while maintaining unchanged test signals for another transmission path. More specifically, during a first period, the first baseband signal TXQP and the second baseband signal TXQN are fed into a positive input node and a negative input node of the first transmission path 292 (e.g. nodes A1 and A2 of the filter 225), respectively. Further, during a second period, the second baseband signal TXQN and the first baseband signal TXQP are fed into the positive input node and the negative input node of the first transmission path 292 (e.g. nodes A1 and A2 of the filter 225), respectively. In this way, the gain asymmetry measuring unit 290 can accordingly measure a response of a positive sideband (as shown in FIG. 3) of the gain asymmetry according to a first baseband loopback signal S1 received from the baseband loopback path 270 during one of the first period and the second period. Further, the gain asymmetry measuring unit 290 measures a response of a negative sideband (as shown in FIG. 4) of the gain asymmetry according to the first baseband loopback signal S1 received from the baseband loopback path 270 during another of the first period and the second period.

Figure 4:
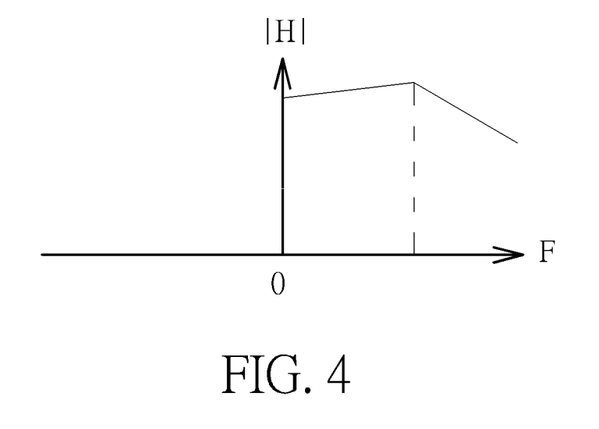
FIG. 4 is a diagram illustrating the frequency response of the negative sideband of the gain asymmetry measured by the gain asymmetry measuring unit shown in FIG. 2.

Please refer to FIGS. 3-4. FIG. 3 is a diagram illustrating the frequency response of the positive sideband of the gain asymmetry measured by the gain asymmetry measuring unit 290 shown in FIG. 2, and FIG. 4 is a diagram illustrating the frequency response of the negative sideband of the gain asymmetry measured by the gain asymmetry measuring unit 290 shown in FIG. 2. After the response of the positive sideband and the response of the negative sideband of the gain asymmetry are obtained by the gain asymmetry measuring unit 290 based on baseband loopback signals, an overall response of the gain asymmetry (i.e. the complete characteristics of gain asymmetry) possessed by the transmitter 201 can be obtained. Please refer to FIG. 5, which is a diagram illustrating the overall frequency response of the gain asymmetry of the transmitter that is generated by combining the frequency response of the positive sideband of the gain asymmetry illustrated in FIG. 3 and the frequency response of the negative sideband of the gain asymmetry illustrated in FIG. 4. Please note that the negative sideband of the gain asymmetry in FIG. 4 needs to be properly reversed to generate the overall frequency response of the gain asymmetry centered at the RF frequency.

It should be noted that a signal at the baseband node B1 and a signal at the baseband node B2 will have the same response during each of the first period and the second period of the proposed gain asymmetry characterization procedure. In an alternative design, the baseband loopback path 270 may be modified to be coupled to a baseband node B2 on the in-phase path 292. In other words, the baseband node B2 where the loopback signal is extracted is located between the RC circuit 230 and the mixer 240. The same objective of determining characteristics of gain asymmetry possessed by the transmitter 201 can still be achieved. This also falls within the scope of the present invention. Moreover, another alternative design is to measure both the basebands B1 and B2 according to design requirements/needs.

Considering a case where the baseband loopback path 270 is arranged to be coupled to the first transmission path of the transmitter 201 for guiding a baseband loopback signal to the gain asymmetry measuring unit 290, the first transmission path may be an in-phase path and the second transmission path may be a quadrature path in a first exemplary design, while the first transmission path may be a quadrature path and the second transmission path may be an in-phase path in a second exemplary design. These all fall within the scope of the present invention.

In this embodiment, the asymmetry characterization is performed with baseband loopback by applying the baseband loopback path 270. Compared with the RF-loopback based method, the baseband measurement (relatively low frequency compared with RF) in this embodiment is less complex and more robust than RF measurement, which is a high frequency. The measured result of the gain asymmetry measuring unit 290 will not be affected by factors encountered by the traditional RF transmitter 100 shown in FIG. 1.

Please note that, although the first baseband signal TXQP and the second baseband signal TXQN are cosine signals with opposite amplitudes (e.g., $-A\cos\Phi$ and $A\cos\Phi$) and the third baseband signal TXIP and the fourth baseband signal TXIN are sine signals with opposite amplitudes (e.g., $A\sin\Phi$ and $-A\cos\Phi$) in this embodiment, this is merely an example, and is not meant to be a limitation of the present invention. In an alternative design, the first baseband signal TXQP and the second baseband signal TXQN may be set by sine signals with opposite amplitudes, and the third baseband signal TXIP and the fourth baseband signal TXIN may be set by cosine signals with opposite amplitudes. By properly flipping/swapping signals included in one differential baseband test signal pair while maintaining unchanged signals included in another differential baseband test signal pair, the response of another sideband of the gain asymmetry can still be obtained.

The proposed baseband-loopback based design and the RF-loopback based design may co-exist in a transmitter system for enhancing flexibility of the gain asymmetry characterization. Please refer to FIG. 6, which is a diagram illustrating a gain asymmetry characterizing circuit 600 of another embodiment of the present invention. The difference between the gain asymmetry characterizing circuit 600 and the gain asymmetry characterizing circuit 200 is that the gain asymmetry characterizing circuit 600 further includes a radio-frequency (RF) loopback path 670, a processing circuit 672 and a multiplexer 674. The RF loopback path 670 is coupled to an RF output node N1 of the transmitter 601. The processing circuit 672 is coupled to the RF loopback path 670, and arranged to generate a second baseband loopback signal S2 according to an RF loopback signal S1' received from the RF loopback path 670. In this embodiment, the processing circuit 672 is part of a receiver 701 included in a transceiver having the transmitter 601. By way of example, but not limitation, the processing circuit 672 may include mixers for applying down-conversion to the RF loopback signal S1' and further include low-pass filters for filtering out unwanted signal components.

Figure 6:
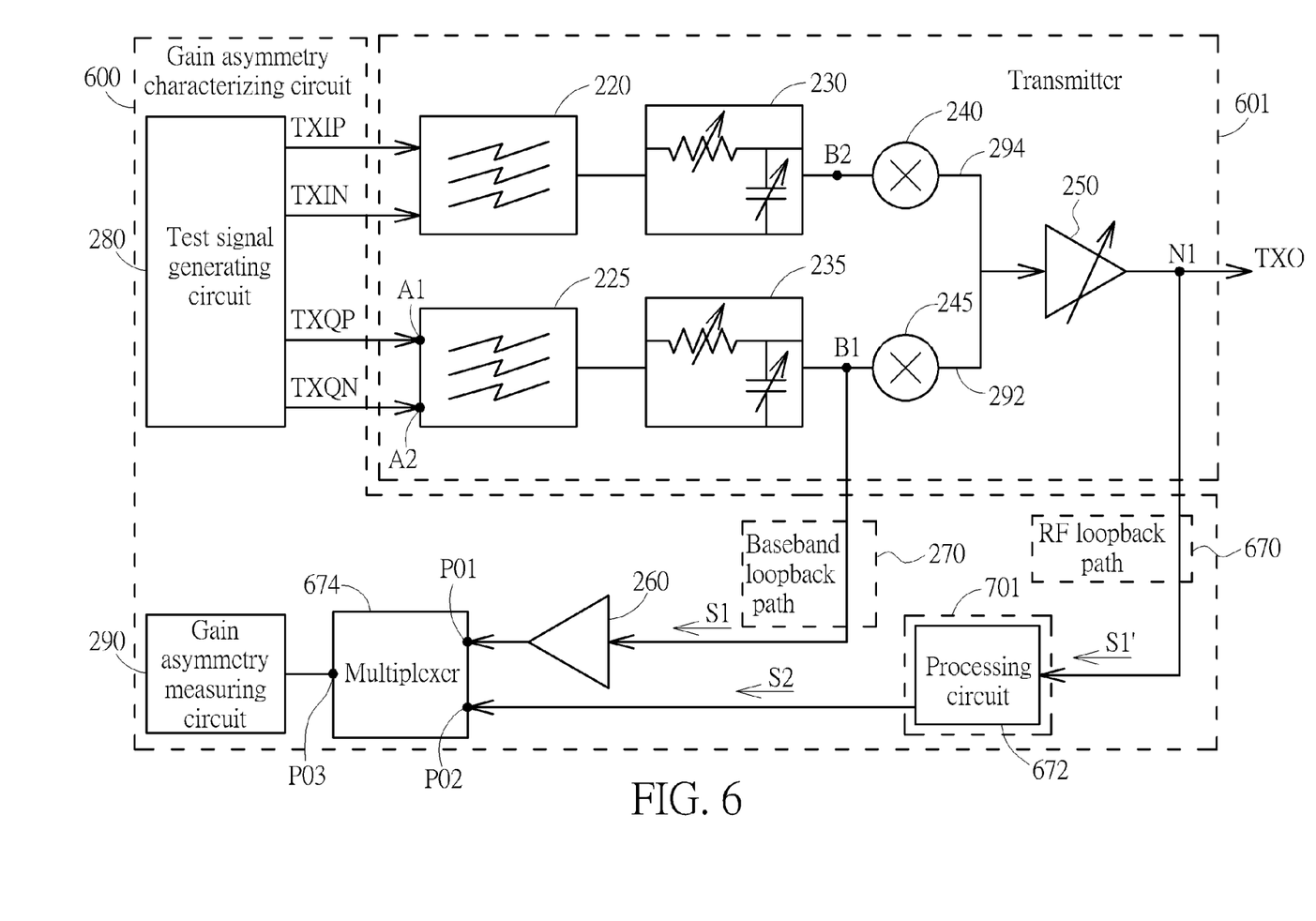
FIG. 6 is a diagram illustrating a gain asymmetry characterizing circuit of another embodiment of the present invention.

The multiplexer 674 has a first input port P01 coupled to the baseband loopback path 270, a second input port P02 coupled to the processing circuit 672, and an output port P03 coupled to the gain asymmetry measuring unit 290. When the multiplexer 674 couples the second input port P02 to the output port P03, the gain asymmetry measuring unit 290 is operative to measure a response of the gain asymmetry according to the second baseband loopback signal S2. When the multiplexer 674 couples the first input port P01 to the output port P03, the gain asymmetry measuring unit 290 is operative to measure a response of the gain asymmetry according to the first baseband loopback signal S1. Hence, based on actual application requirements, the response of the gain asymmetry may be derived from a gain asymmetry characterization result of the baseband-loopback based scheme, again asymmetry characterization result of the RF-loopback based scheme, or a combination of gain asymmetry characterization results of the baseband-loopback based scheme and the RF-loopback based scheme.

Figure 7:
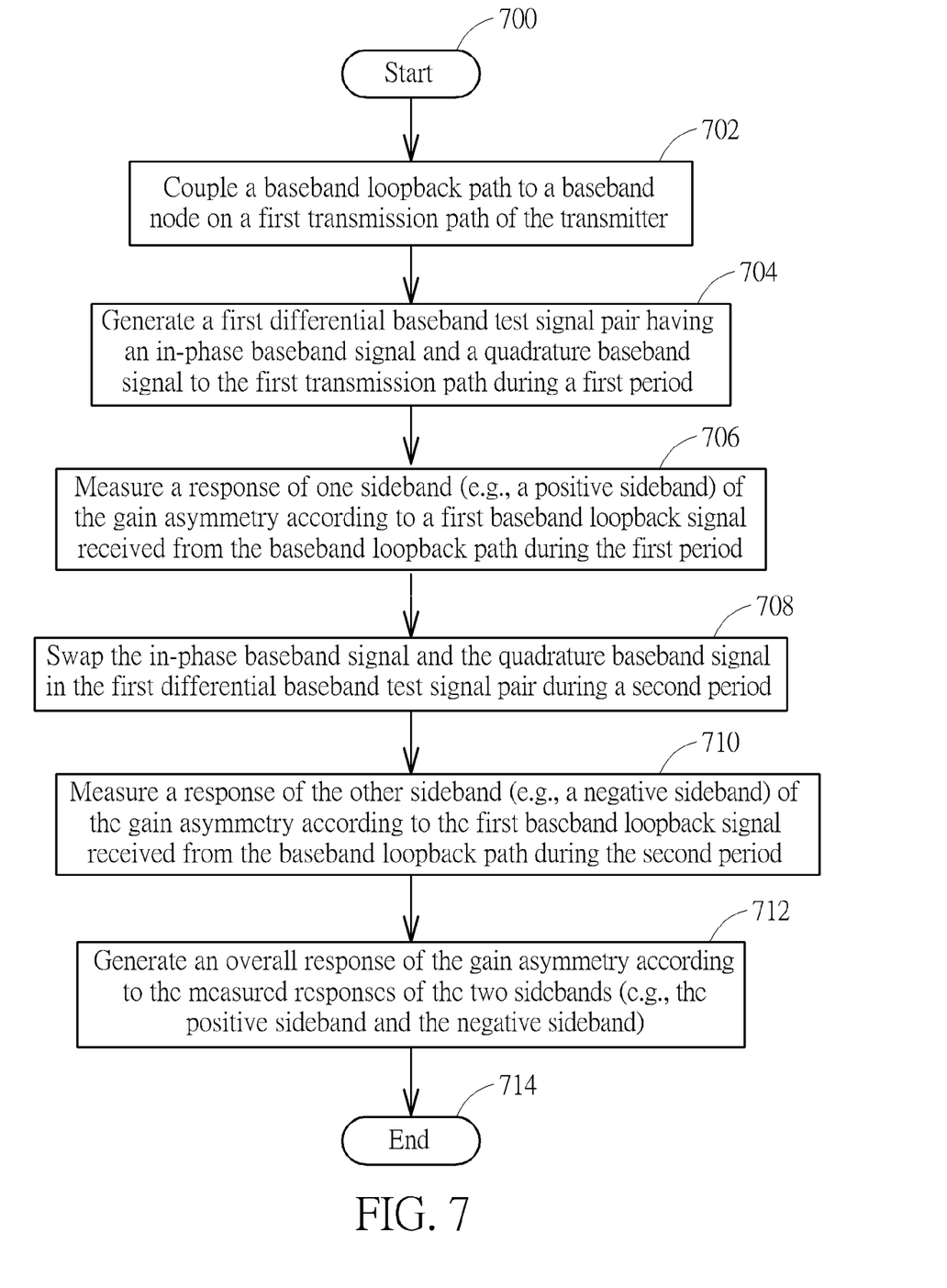
FIG. 7 is a flowchart illustrating a gain asymmetry characterizing method according to an embodiment of the present invention.

Please refer to FIG. 7, which is a flowchart illustrating a gain asymmetry characterizing method according to an embodiment of the present invention. The gain asymmetry characterizing method in FIG. 7 is utilized for determining characteristics of gain asymmetry possessed by a transmitter. Provided that the result is substantially the same, the steps are not required to be executed in the exact order shown in FIG. 7. The exemplary method may be employed by the gain asymmetry characterizing circuit 200 shown in FIG. 2, and can be briefly summarized using the following steps. Please note that the method shown in FIG. 7 is provided for baseband feedback only, while the method shown in FIG. 8 can be further applied for RF feedback.

Step 700: Start.

Step 702: Couple a baseband loopback path to a baseband node on a first transmission path of the transmitter.

Step 704: Generate a first differential baseband test signal pair having an in-phase baseband signal and a quadrature baseband signal to the first transmission path during a first period.

Step 706: Measure a response of one sideband (e.g., a positive sideband) of the gain asymmetry according to a first baseband loopback signal received from the baseband loopback path during the first period.

Step 708: Swap (interchange) the in-phase baseband signal and the quadrature baseband signal in the first differential baseband test signal pair during a second period.

Step 710: Measure a response of the other sideband (e.g., a negative sideband) of the gain asymmetry according to the first baseband loopback signal received from the baseband loopback path during the second period.

Step 712: Generate an overall response of the gain asymmetry according to the measured responses of the two sidebands (e.g., the positive sideband and the negative sideband).

Step 714: End.

As a person skilled in the art can readily understand details of each step shown in FIG. 7 after reading the above paragraphs directed to the gain asymmetry characterizing circuit 200 shown in FIG. 2, further description is omitted here for brevity.

Figure 8:
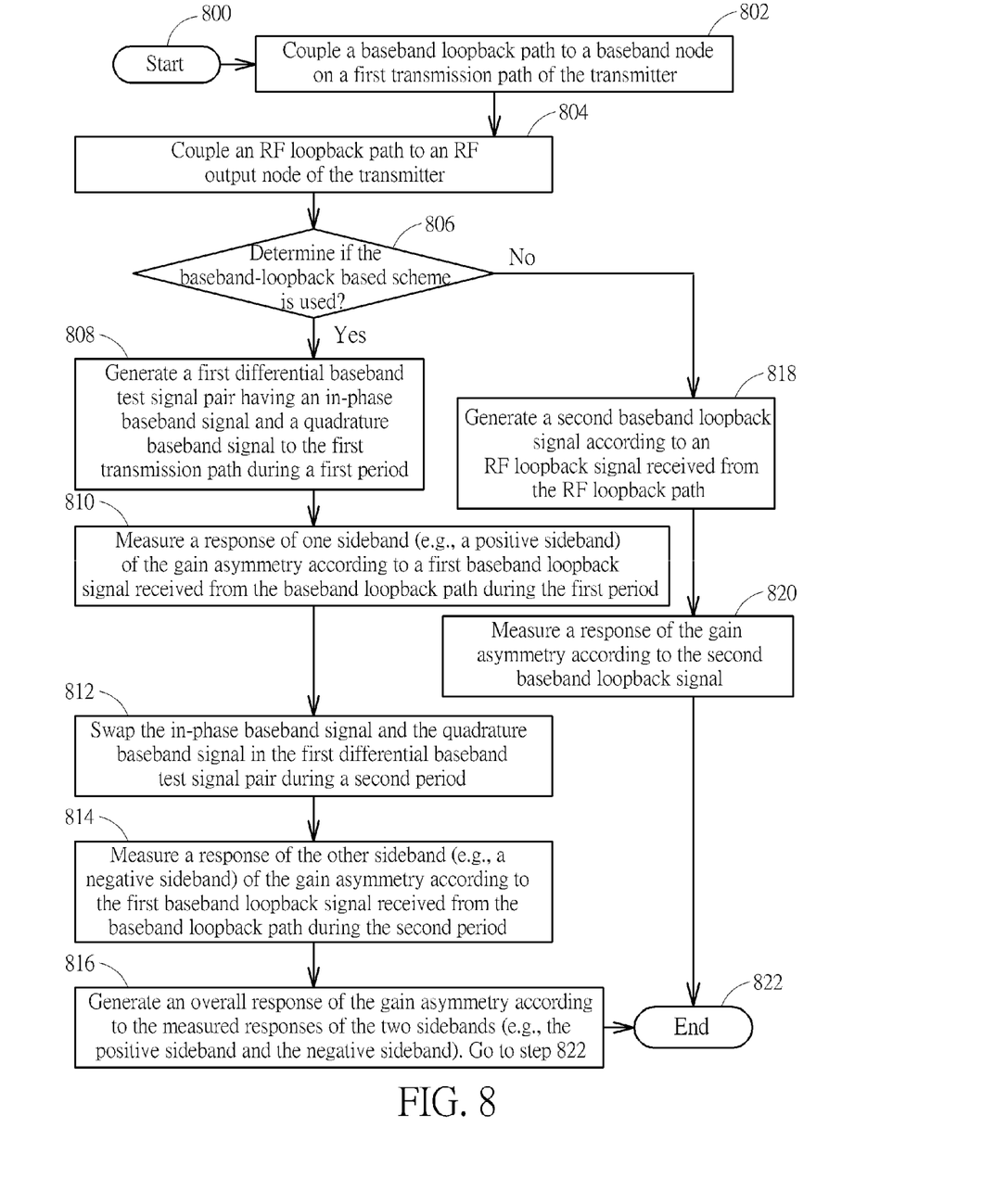
FIG. 8 is a flowchart illustrating a gain asymmetry characterizing method according to another embodiment of the present invention.

Please refer to FIG. 8, which is a flowchart illustrating a gain asymmetry characterizing method according to another embodiment of the present invention. The gain asymmetry characterizing method in FIG. 8 is utilized for determining characteristics of gain asymmetry possessed by a transmitter. Provided that the result is substantially the same, the steps are not required to be executed in the exact order shown in FIG. 8. For example, steps 804 and 806 can be performed before step 802. The exemplary method may be employed by the gain asymmetry characterizing circuit 600 shown in FIG. 6, and can be briefly summarized using the following steps.

Step 800: Start.

Step 802: Couple a baseband loopback path to a baseband node on a first transmission path of the transmitter.

Step 804: Couple an RF loopback path to an RF output node of the transmitter.

Step 806: Determine if the baseband-loopback based scheme is used. If yes, go to step 808; otherwise, go to step 818.

Step 808: Generate a first differential baseband test signal pair having an in-phase baseband signal and a quadrature baseband signal to the first transmission path during a first period.

Step 810: Measure a response of one sideband (e.g., a positive sideband) of the gain asymmetry according to a first baseband loopback signal received from the baseband loopback path during the first period.

Step 812: Swap (interchange) the in-phase baseband signal and the quadrature baseband signal in the first differential baseband test signal pair during a second period.

Step 814: Measure a response of the other sideband (e.g., a negative sideband) of the gain asymmetry according to the first baseband loopback signal received from the baseband loopback path during the second period.

Step 816: Generate an overall response of the gain asymmetry according to the measured responses of the two sidebands (e.g., the positive sideband and the negative sideband). Go to step 822.

Step 818: Generate a second baseband loopback signal according to an RF loopback signal received from the RF loopback path.

Step 820: Measure a response of the gain asymmetry according to the second baseband loopback signal.

Step 822: End.

As a person skilled in the art can readily understand details of each step shown in FIG. 8 after reading the above paragraphs directed to the gain asymmetry characterizing circuit 600 shown in FIG. 6, further description is omitted here for brevity.

Through utilizing the embodiments of the present invention, the characteristics of gain asymmetry possessed by a transmitter can be determined. Proper compensations based on the measured response to the gain asymmetry can thereby be applied for achieving a symmetrical transfer function in RF.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A gain asymmetry characterizing circuit for determining characteristics of gain asymmetry possessed by a transmitter, comprising:
   a baseband loopback path, coupled to a baseband node on a first transmission path of the transmitter;
   a test signal generating circuit, arranged to generate a first differential baseband test signal pair to the first transmission path, wherein the first differential baseband test signal pair includes a first baseband signal and a second baseband signal; during a first period, the first baseband signal and the second baseband signal are fed into a positive input node and a negative input node of the first transmission path, respectively; and during a second period, the second baseband signal and the first baseband signal are fed into the positive input node and the negative input node of the first transmission path, respectively; and
   a gain asymmetry measuring circuit, arranged to measure a response of a positive sideband of the gain asymmetry according to a first baseband loopback signal received from the baseband loopback path during one of the first period and the second period, and measure a response of a negative sideband of the gain asymmetry according to the first baseband loopback signal received from the baseband loopback path during the other of the first period and the second period.

2. The gain asymmetry characterizing circuit of claim 1, further comprising:
   a baseband buffer, coupled between the baseband loopback path and the gain asymmetry measuring circuit.

3. The gain asymmetry characterizing circuit of claim 2, wherein the baseband node is located between a filter and a mixer.

4. The gain asymmetry characterizing circuit of claim 3, wherein an input impedance of the baseband buffer is higher than an input impedance of the mixer and an output impedance of the filter.

5. The gain asymmetry characterizing circuit of claim 2, wherein the baseband buffer has a flat frequency response across a gain asymmetry bandwidth.

6. The gain asymmetry characterizing circuit of claim 1, wherein the test signal generating circuit is further arranged to generate a second differential baseband test signal pair to a second transmission path of the transmitter, the second differential baseband test signal pair includes a third baseband signal and a fourth baseband signal; and during each of the first period and the second period, the third baseband signal and the fourth baseband signal are fed into a positive input node and a negative input node of the second transmission path, respectively.

7. The gain asymmetry characterizing circuit of claim 6, wherein one of the first transmission path and the second transmission path is an in-phase path, and the other of the first transmission path and the second transmission path is a quadrature path.

8. The gain asymmetry characterizing circuit of claim 1, further comprising:
   a radio-frequency (RF) loopback path, coupled to an RF output node of the transmitter;
   a processing circuit, coupled to the RF loopback path and arranged to generate a second baseband loopback signal according to an RF loopback signal received from the RF loopback path; and
   a multiplexer, having a first input port coupled to the baseband loopback path, a second input port coupled to the processing circuit, and an output port coupled to the gain asymmetry measuring circuit, wherein when the multiplexer couples the second input port to the output port, the gain asymmetry measuring circuit is further arranged to measure a response of the gain asymmetry according to the second baseband loopback signal.

9. The gain asymmetry characterizing circuit of claim 8, wherein the processing circuit is part of a receiver included in a transceiver which includes the transmitter.

10. The gain asymmetry characterizing circuit of claim 1, wherein the first baseband signal and the second baseband signal are single-tone sinusoidal signals, and opposite in amplitudes.

11. A gain asymmetry characterizing method for determining characteristics of gain asymmetry possessed by a transmitter, comprising:
    coupling a baseband loopback path to a baseband node on a first transmission path of the transmitter;
    generating a first differential baseband test signal pair to the first transmission path, wherein the first differential baseband test signal pair includes a first baseband signal and a second baseband signal; during a first period, the first baseband signal and the second baseband signal are fed into a positive input node and a negative input node of the first transmission path, respectively; and during a second period, the second baseband signal and the first baseband signal are fed into the positive input node and the negative input node of the first transmission path, respectively;
    measuring a response of a positive sideband of the gain asymmetry according to a first baseband loopback signal received from the baseband loopback path during one of the first period and the second period; and
    measuring a response of a negative sideband of the gain asymmetry according to the first baseband loopback signal received from the baseband loopback path during another of the first period and the second period.

12. The gain asymmetry characterizing method of claim 11, further comprising:
    generating a second differential baseband test signal pair to a second transmission path of the transmitter, wherein the second differential baseband test signal pair includes a third baseband signal and a fourth baseband signal; and during each of the first period and the second period, the third baseband signal and the fourth baseband signal are fed into a positive input node and a negative input node of the second transmission path, respectively.

13. The gain asymmetry characterizing method of claim 12, wherein one of the first transmission path and the second transmission path is an in-phase path, and the other of the first transmission path and the second transmission path is a quadrature path.

14. The gain asymmetry characterizing method of claim 11, further comprising:
    coupling a radio-frequency (RF) loopback path to an RF output node of the transmitter;
    generating a second baseband loopback signal according to an RF loopback signal received from the RF loopback path;
    performing a multiplexing operation upon the first baseband loopback signal and the second baseband loopback signal; and
    when the second baseband loopback signal is selected by the multiplexing operation, measuring a response of the gain asymmetry according to the second baseband loopback signal;
    wherein the step of measuring the response of the positive sideband of the gain asymmetry and measuring the response of the negative sideband of the gain asymmetry is performed when the first baseband loopback signal is selected by the multiplexing operation.

15. The gain asymmetry characterizing method of claim 11, wherein the first baseband signal and the second baseband signal are single-tone sinusoidal signals with opposite amplitudes.

* * * * *